United States Patent [19]

Charnley

[11] 4,260,420

[45] Apr. 7, 1981

[54] AQUEOUS LIQUID ADHESIVE COMPOSITION AND METHOD

[75] Inventor: Denis H. Charnley, Woburn, Mass.

[73] Assignee: Chemcom Corporation, Boston, Mass.

[21] Appl. No.: 56,723

[22] Filed: Jul. 11, 1979

[51] Int. Cl.$^3$ ............................................. C04B 35/16
[52] U.S. Cl. ...................................................... 106/74
[58] Field of Search ........................... 106/74; 423/332

[56] References Cited

U.S. PATENT DOCUMENTS

| | | | |
|---|---|---|---|
| 3,898,318 | 8/1975 | Pierce | 423/332 |
| 3,961,022 | 6/1976 | Pierce | 423/332 |

FOREIGN PATENT DOCUMENTS 625033  8/1961  Canada ........................ 106/74

*Primary Examiner*—James Poer
*Attorney, Agent, or Firm*—Weingarten, Maxham & Schurgin

[57] ABSTRACT

An aqueous adhesive liquid with pronounced bonding capacity is provided which bonds to a broad variety of material in concentrated and diluted strength and is suitable for use with matter subjected to stress and vibration.

10 Claims, No Drawings

AQUEOUS LIQUID ADHESIVE COMPOSITION AND METHOD

FIELD OF THE INVENTION

This invention relates to adhesives and more particularly to an aqueous liquid adhesive and a method of forming such adhesive.

BACKGROUND OF THE INVENTION

Although many silicate compounds exist, only the alkali-metal silicates are capable of being dissolved in water and of these the best known are sodium silicate and potassium silicate. Sodium silicate is a generic term for a family of chemical compounds composed of sodium oxide ($Na_2O$) silica ($SiO_2$) and water.

Aqueous solutions of sodium silicate and potassium silicate are commonly used as adhesives and binders. The usefulness of such adhesives is directly dependent on its bonding capacity and the compatability with adsorbing material with which it is employed. A major problem of known sodium silicate solutions has been its limited bonding strength when used with material or objects which are subject to stress and vibration.

Aqueous sodium silicate solutions or potassium silicate solutions having different alkalinities and concentrations may be prepared by adjusting the proportion of silica ($SiO_2$) to sodium oxide ($Na_2O$) or potassium oxide ($K_2O$) and by controlling the percentage of total solids in the solution. Using sodium silicate as an example, the proportion of $SiO_2$ to $Na_2O$ is commonly expressed on a ratio basis; typical formulations range from $Na_2O \cdot 3.9SiO_2$, having a $SiO_2/Na_2O$ ratio of 3.9, to $Na_2O \cdot 1.58SiO_2$, having a $SiO_2/Na_2O$ ratio of 1.58.

The viscosity and total solids contents of aqueous sodium silicate solutions are functions of the $SiO_2/Na_2O$ ratio: an aqueous sodium silicate solution having a $SiO_2/Na_2O$ ratio of about 2.00 has a minimum viscosity and a maximum total solids content. If the total solids content is held constant and the $SiO_2/Na_2O$ ratio is other than 2.00, the aqueous sodium silicate solution will have an increased viscosity. Similarly if the viscosity is held constant and the $SiO_2/Na_2O$ ratio is other than about 2.00, the aqueous sodium silicate solution will have a decreased total solids content.

Sodium silicate solutions having smaller $SiO_2/Na_2O$ ratios of approximately 1.87 to 2.40 are sticky and tacky but change slowly from liquid to solid form with a relatively large loss of water. Solutions having larger $SiO_2/Na_2O$ ratio in the 2.8 to 3.8 range change from liquid to semi-solid form quickly with a relatively small loss of water. These are valuable as adhesives. The characteristic ability of aqueous sodium silicate solutions having large $SiO_2/Na_2O$ ratios to set quickly on initial application and to form a strong durable bond with a minimum of penetration into the joined matter is the principle reason for its wide use as an adhesive.

SUMMARY OF THE INVENTION

In accordance with the present invention, an aqueous adhesive liquid is provided which has pronounced bonding strength to permit relatively thick layers of insulating material to be applied to wall and other surfaces, and capable of withstanding stress and vibration without loss of bond. The adhesive can be prepared in advance of use and conveniently stored in concentrated form. Whether in concentrated of diluted strength, the novel adhesive may be used for many bonding purposes. The adhesive is especially useful with fire-resistant cellulose in fabricating wall board or as spray insulation which can be applied directly onto interior building walls. The invention will be more fully understood from the following detailed description.

DETAILED DESCRIPTION OF THE INVENTION

The present invention is an adhesive comprising an aqueous liquid of either sodium silicate or potassium silicate, and flocculent alkali-metal silicate particles dissolved therein. Using sodium silicate as the principal example, it is the correct proportions of aqueous sodium silicate solution (which may vary both in total solids content and $SiO_2/Na_2O$ ratio), flocculent sodium silicate particles, and water properly combined, yielding a defined resulting product which is the essence of the invention. As the aqueous sodium silicate solution is varied in both total solids content and $SiO_2/Na_2O$ ratio, the optimum quantities of dry flocculent sodium silicate particles and water must be varied to yield the chemically defined adhesive which possesses the maximum bonding capacity. Using these ingredients in less than their quantitatively optimum proportions will yield an adhesive with less bonding capacity than is possible using optimum proportions.

In its preferred embodiment, the invention comprises one avoirdupois pound of a dried flocculent preparation of alkali-metal particles, a commercially available example is Grade 200 or Grade 300 Q-Cel inorganic microspheres from Philadelphia Quartz Company, U.S Pat. Nos. 3,796,777 and 3,794,503; one U.S. gallon of a 38.3 percent aqueous sodium silicate solution having a $SiO_2/Na_2O$ ratio of 3.22, an example commercially available is Grade 40 aqueous solution silicate from Diamond Shamrock Corporation; and one pint, sixteen fluid ounces, of water. The chemical composition of the dry flocculent particles is well described in the above-identified patents. The dry particles are hollow spheres comprising: an inorganic polysalt selected from the group consisting of borate salts of alkali-metal and ammonium cations and phosphate salts of alkali-metals and ammonium cations: an alkali-metal silicate selected from the group consisting of sodium silicate and potassium silicate; and water.

Initially, the dry flocculent alkali-metal particles are combined with ordinary tap water heated to approximately 190° F. Hot water is preferred over cold to break up and disperse the flocculent alkali-metal particles evenly. These ingredients are placed in a Hobart cake mixer or other mixing apparatus having a paddle attachment and mixed at slow speed for three to five minutes or equivalent time to insure a thorough dispersion and saturation of the sodium silicate particles throughout the liquid. The properly mixed liquid is a white suspension without lumps or remnants of particles floating on its surface. The total volume of the prepared suspension is approximately 2½ to 3 pints.

Following this, the blending phase combines the prepared suspension of alkali-metal particles with one gallon of aqueous sodium silicate solution having a density value of 41.5 Baume degrees (Be.), where the Baume degree is defined as $$Be. = 145 - \frac{145}{\text{specific gravity}}$$

where zero degrees Baume corresponds to 1.000, the specific gravity of water at 4° C. The preferred aqueous sodium silicate is a 38.3 percent solution of the formula Na$_2$O. 3.22SiO$_2$, having a SiO$_2$/Na$_2$O ratio of 3.22. However, any aqueous sodium silicate solution having any total solid content and any SiO$_2$/Na$_2$O ratio with a density of 41.5 Baume degrees is equally acceptable.

The blending of these ingredients at room temperature may be accomplished using a ribbon blender or any other conventional mixing apparatus. Physical agitation must occur for at least fifteen minutes in every hour once the blending process begins and must continue for at least twenty-four hours in sequence. Agitation may be continuous for the entire twenty-four hour period if desired. The blending process may be stopped at will at any point and continued at a later time; however, the total blending time required to prepare the completed adhesive will be longer than the former twenty-four hour period. Blending is complete only when the solution becomes completely clear and no residual white matter floats on the surface. This will occur only after the minimal twenty-four hours mixing time. The proper blending of the prepared alkali-metal particle suspension with the aqueous sodium silicate solution will raise the density of the prepared adhesive to 43.5 Baume units. The total volume of the concentrate is approximately 9¼ pints when completed.

In addition, aqueous sodium silicate solutions having a density other than 41.5 Baume units may be used. In such situations, the quantities of dried flocculent alkali-metal particles and water may vary from the quantities previously specified. Moreover, the completed adhesive embodying the invention need not have a density of 43.5 Baume units precisely. Rather, the invention includes any blended liquid comprised of an aqueous sodium silicate solution, dried flocculent alkali-metal particles and water which yields a solution ranging in density values from 42.5 to 45.0 Baume units at 20° C. The previously stated formulation, quantity, and proportion of ingredients is the preferred mode because it provides an adhesive with maximum bonding capacity at minimal economic costs. Adhesives using other formulations, quantities, or proportion of ingredients are functional, but these may have less bonding capacity than the preferred composition and be commercially more expensive to prepare.

The invention may be prepared in large lots well in advance of anticipated use and conveniently stored, indefinitely, in any bulk container. The adhesive, once prepared, withstands both heat and cold without loss of bonding strength. In particular, it may even be frozen, as may occur during transport in winter or at any temperature below approximately 30° F.; there is no loss of bonding strength when the adhesive is thawed to liquid and remixed.

The prepared adhesive may be used with a broad variety of matter including paper, wood and metal; the concentrate is compatible with latex and other compounds utilizing latex as an ingredient. The adhesive should not be used with strong ammonia solutions, particularly ammonium sulphate. Similarly, products containing large concentration of alcohol or salt brine are not compatible. Normally the adhesive hardens in five to six hours and is completely cured within twenty-four hours. Care, however, should be taken to avoid using the adhesive in high humidity areas as prolonged exposure to high moisture tends to decrease the bonding strength of the adhesive over time.

In concentrated strength the adhesive functions as a structural bonding agent for a broad variety of materials. It bonds multiple sheets of matter into a single laminated board. In particular, the adhesive is an excellent bonding agent for materials of different chemical origin such as plywood and expanded polystyrene. As a general adhesive, it bonds any lightweight material.

The adhesive, however, may be diluted with water and serve a variety of purposes more economically. When diluted in a 1 to 3 ratio, volume to volume (V/V) with water, the adhesive functions as an excellent binder with cellulose in making cellulose boards. When molded and pressed into sheets, this composition of adhesive and cellulose, without the addition of any other ingredient, provides a lightweight and durable board with distinctive fire-retardant properties. If desired, ground inorganic ores such as Virmiculite or Perlite may be added to the diluted adhesive and cellulose mixture and pressed into sheets. Such sheets are structurally stronger in tensile strength and are completely fire-proof.

When diluted in 1 to 4 ratios (V/V) with water, the adhesive is an improved bonding agent for spray insulation. In combination with fire-resistant cellulose or other insulating matter, the mixture may be sprayed via any conventional spray apparatus into enclosed spaces between exterior and interior building walls or directly onto any vertical surface. The diluted adhesive has such pronounced bonding strength that six inch layers of insulating matter may be applied in a single spraying application onto adsorbant surfaces. If the surface is horizontal (such as a ceiling), particularly smooth, or metal in composition, layers four inches in thickness may be applied in a single spraying application. The diluted adhesive in singularly suited for insulation of vibrating surfaces, commonly the most difficult areas to insulate. Ventilation ducts, heating ducts, and plumbing fixtures are particularly difficult to insulate due to the recurring internal vibrations which normally accompany their use. Typically, spray installation of cellulose insulation onto such surfaces is minimal or impossible because of the inability of bonding agents in the insulating mixture to adhere sufficiently and to withstand the continuing fluctuations of the vibrating surfaces. The bonding capacity of the described diluted adhesive permits spray installation of four to six inch layers of insulation directly onto the vibrating surfaces without subsequent loosening or peeling.

Although in the above description sodium silicate has been set forth as the preferred alkali-metal silicate, the adhesive of this invention may be prepared equally well using potassium silicate.

The invention is not to be limited by what has been particularly described except as indicated in the appended claims.

What is claimed is:

1. An aqueous liquid adhesive having an increased bonding capacity compared to the bonding capacity of the corresponding aqueous alkali-metal silicate solution alone comprising:

an aqueous alkali-metal silicate solution; and
a sufficient quantity of dry flocculent alkali-metal silicate particles dissolved in said aqueous alkali-metal silicate solution to yield a liquid having a density value in the range of 42.5 to 45.0 Baume degrees, said flocculent particles comprising an inorganic polysalt selected from the group consisting of borate salts of alkali-metal and ammonium cations and phosphate salts of alkali-metal and ammonium cations, an alkali-metal silicate selected from the group consisting of sodium silicate and potassium silicate, and water.

2. The aqueous adhesive as recited in claim 1 wherein said aqueous alkali-metal silicate solution includes aqueous sodium silicate solutions.

3. An aqueous adhesive liquid having an increased bonding capacity compared to the bonding capacity of the corresponding aqueous alkali-metal silicate solution alone comprising:
   a 38.8% aqueous sodium silicate solution having the formula $Na_2O.3.22SiO_2$ and a density value of 41.5 Baume degrees; and
   a sufficient quantity of dry flocculent alkali-metal silicate particles dissolved in said aqueous sodium silicate solution to yield a liquid having a density value of 43.5 Baume degrees, said flocculent particles comprising an inorganic polysalt selected from the group consisting of borate salts of alkali-metal and ammonium cations and phosphate salts of alkali-metal and ammonium cations, an alkali-metal silicate selected from the group consisting of sodium silicate and potassium silicate, and water.

4. An aqueous liquid adhesive having an increased bonding capacity compared to the bonding capacity of the identically diluted corresponding aqueous alkali-metal silicate solution alone comprising:
   an aqueous alkali-metal silicate solution;
   a sufficient quantity of dry flocculent alkali-metal silicate particles dissolved in said aqueous alkali-metal silicate solution to yield a liquid having a density value in the range of 42.5 to 45.0 Baume degrees, said flocculent particles comprising an inorganic polysalt selected from the group consisting of borate salts of alkali-metal and ammonium cations and phosphate salts of alkali-metal and ammonium cations, an alkali-metal silicate selected from the group consisting of sodium silicate and potassium silicate, and water; and
   water sufficient to dilute said liquid having a density value in the range of 42.5 to 45.0 Baume degrees in any ratio.

5. The aqueous liquid adhesive as recited in claim 2 wherein said aqueous sodium silicate solution has a density value of 41.5 Baume degrees.

6. The aqueous liquid adhesive as recited in claim 2 wherein said aqueous sodium silicate solution has the formula $Na_2O.3.22SiO_2$.

7. The aqueous liquid adhesive as recited in claim 2 wherein said aqueous sodium silicate solution has a 38.3% total solids content.

8. The aqueous liquid adhesive as recited in claims 1 or 3 wherein the quantity of ingredients is in the ratio comprising:
   one U.S. gallon, 128 fluid ounces, of aqueous alkali-metal silicate solution; and
   one avoirdupois pound, sixteen ounces, of dry flocculent alkali-metal silicate particles.

9. The aqueous liquid adhesive as recited in claim 1 wherein said aqueous alkali-metal silicate solution includes aqueous potassium silicate solutions.

10. A method for the preparation of an aqueous liquid adhesive having an increased bonding capacity compared to the bonding capacity of the corresponding aqueous alkali-metal silicate solution alone, said method comprising the steps of:
   dispersing dry flocculent alkali-metal silicate particles in sufficient water to form a homogeneous suspension;
   combining the homogeneous suspension with an aqueous alkali-metal silicate solution to form a blending mixture; and
   agitating the blending mixture vigorously at least fifteen minutes in every hour sequentially, at room temperature, for at least twenty-four hours to yield a liquid having a density value in the range of 42.5 to 45.0 Baume degrees.

* * * * *

UNITED STATES PATENT AND TRADEMARK OFFICE
CERTIFICATE OF CORRECTION

PATENT NO. : 4,260,420
DATED : April 7, 1981
INVENTOR(S) : Denis H. Charnley

It is certified that error appears in the above–identified patent and that said Letters Patent are hereby corrected as shown below:

Column 1, line 23, "material" should read --materials--;
line 32, "$Na_2O.$" should read --$Na_2O\cdot$--;
line 33, "$Na_2O.$" should read --$Na_2O\cdot$--; and
line 67, "of" should read --or--;

Column 2, line 36, "solution" should read --sodium--;

Column 3, line 4, "$Na_2O. \; 3.22SiO_2,$" should read
--$Na_2O\cdot 3.22SiO_2,$--;

Column 5, line 13, "a 38.8%" should read --a 38.3%--; and
line 14, "$Na_2O.3.22SiO_2$" should read
--$Na_2O\cdot 3.22SiO_2$--;

Column 6, line 11, "$Na_2O.3.22SiO_2.$" should read
--$Na_2O\cdot 3.22SiO_2.$--.

Signed and Sealed this

Eleventh Day of August 1981

[SEAL]

Attest:

GERALD J. MOSSINGHOFF

Attesting Officer

Commissioner of Patents and Trademarks